United States Patent Office 3,716,113
Patented Feb. 13, 1973

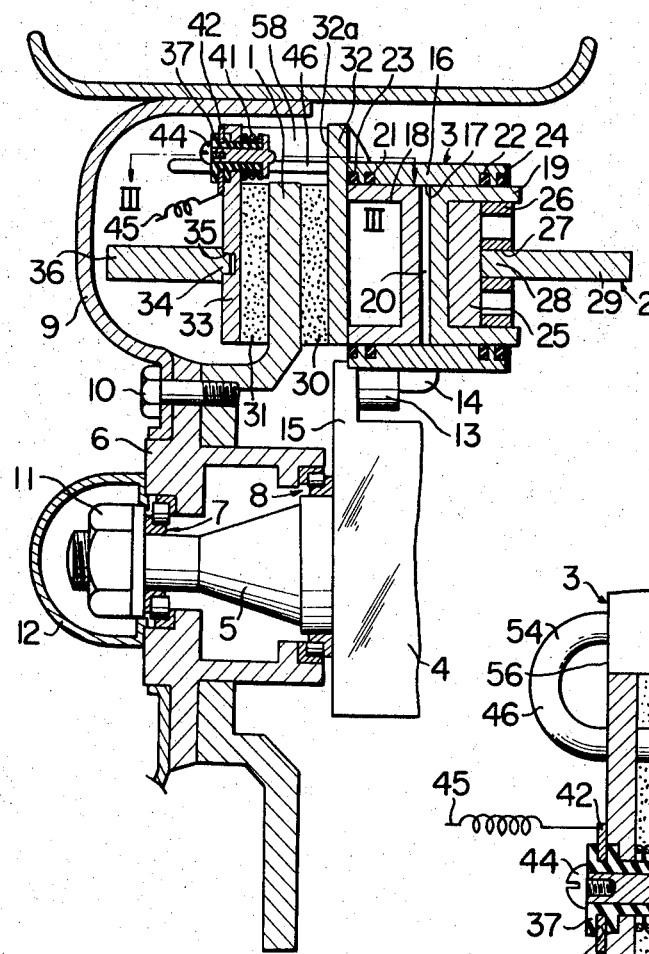
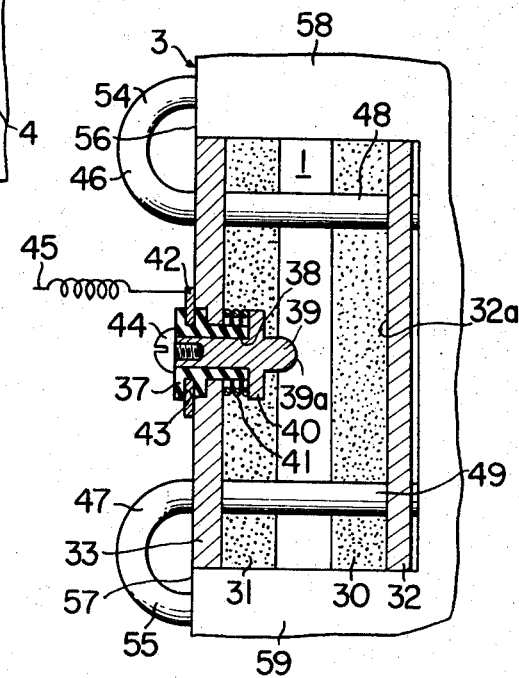

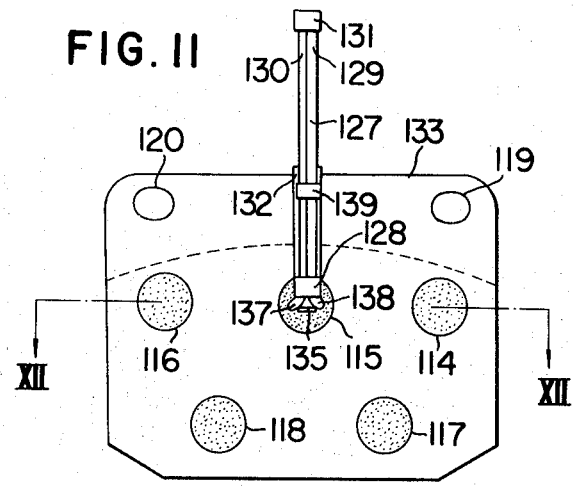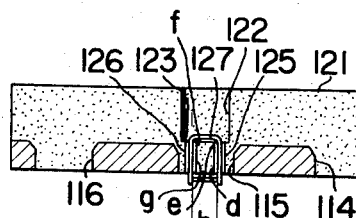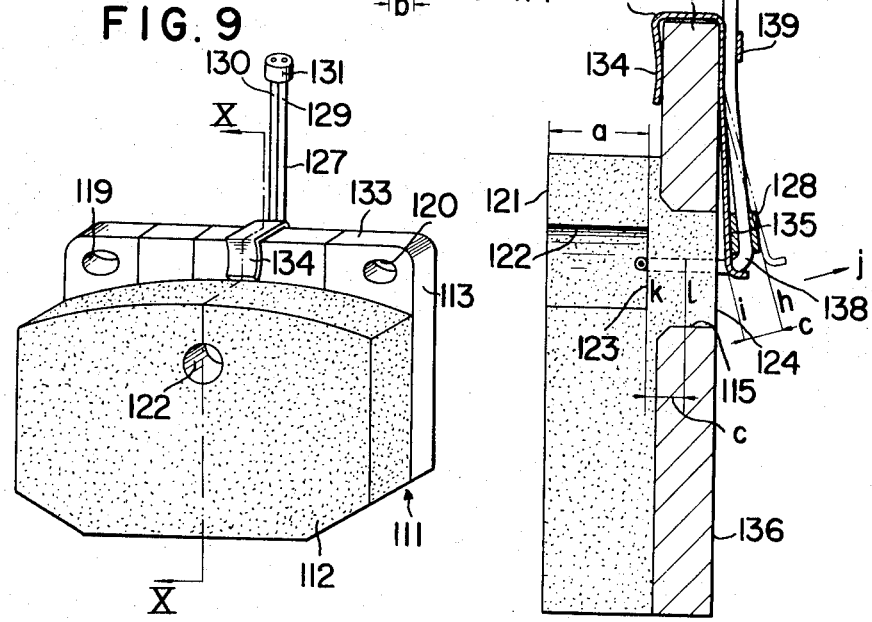

3,716,113
WARNING DEVICE FOR INDICATING WEAR OF FRICTION PADS IN DISK BRAKE
Toyoaki Kobayashi, Naoji Sakakibara, and Toshio Kondo, Kariya, Japan, assignors to Aisin Seiki Kabushiki Kaisha, Kariya-shi, Japan
Filed Oct. 30, 1970, Ser. No. 85,480
Claims priority, application Japan, Nov. 1, 1969, 44/57,450; June 25, 1970, 45/24,531, 45/24,533
Int. Cl. F16d 66/02
U.S. Cl. 188—1 A      3 Claims

ABSTRACT OF THE DISCLOSURE

Each friction pad of a brake disk is provided with a detecting switch device operating to open a detection circuit when the pad is worn to an allowable wear limit thereby to cause a warning lamp to be lit. The detecting switch device may be a switch operated by movement of a backing metal supporting the friction pad, a wire cut by abrasion thereof by the brake disk, or contacts released by abrasion or contact by the brake disk, a spring device in each case preventing the detection circuit thus opened from being closed again.

BACKGROUND OF THE INVENTION

This invention relates generally to disk brakes and more particularly to a new and advanced warning device for rendering an alarm to indicate excessive wear of friction pads used in disk brake mechanisms of motor vehicles and other vehicles.

Heretofore, in a device of this class, the limiting or maximum-allowable degree of wear of the friction pads has been detected by the closure of a detecting switch for detecting friction pad wear to turn on a warning lamp. In a known device of this character, however, a degree of wear which has reached the limiting value cannot be detected when the electrical wiring in the vicinity of the detecting switch installed outside of the passenger compartment is broken because of a reason other than wear of the friction pads, that is, for example, when the wiring breaks because of corrosion due to contact with substances such as mud and water. Accordingly, the warning lamp cannot be lit under such circumstances.

Furthermore, in known warning devices of this class, it has been a common practice to insert the lead wire and terminal of the detecting switch into a friction pad or between the friction pad and the backing metal at the time the pad and the backing metal are being formed. However, it has been extremely difficult to insert the lead wire and terminal in a manner such that the warning is rendered through the lead wire and terminal when the limiting degree of wear of the friction pads is reached.

In some known warning devices of this character, moreover, detection of wear is accomplished by the lead wire terminal thus inserted, which is exposed and contacts the brake disk thereby closing a detection signal circuit when the limiting degree of wear of the pads is reached. Alternatively, the lead wire is designed to contact the brake disk and be broken by rubbing wear when the limiting wear is reached, whereby a circuit is opened to effect a warning. However, since the disk is made of a metal and is electro-conductive, the detection circuit is closed when the disk brake is applied, and the warning signal is terminated. When the brake is released, there is the possibility of the broken ends of the lead wire remaining in contact with the brake disk to continue the closed circuit state, whereby the warning cannot be rendered.

SUMMARY OF THE INVENTION

It is an object of the present invention to overcome the above described difficulties accompanying the known art and to provide, in a disk brake of the instant class, a wear-warning device of highly reliable operation.

According to the present invention, briefly summarized, there is provided in a disk brake of the class referred to above, a wear-warning device comprising detecting means operating to open a detection circuit when the wear of at least one friction pad reaches a maximum allowable limit and a warning circuit operating in response to the opening of the detection circuit to produce a warning.

The nature, principles, details, and utility of the invention will be more clearly apparent from the following detailed description with respect to preferred embodiments of the invention when read in conjunction with the accompanying drawings, in which like parts are designated by like reference numerals.

BRIEF DESCRIPTION OF THE DRAWINGS

In the drawings:

FIG. 2 is a section taken along the plane indicated by line II—II in FIG. 1 as viewed in the arrow direction;

FIG. 3 is an enlarged view of a section taken along the plane indicated by line III—III in FIG. 2 as viewed in the arrow direction;

FIG. 9 is a perspective view showing a sixth example of embodiment of the invention;

FIG. 10 is a section taken along the plane indicated by line X—X in FIG. 9 as viewed in the arrow direction;

FIG. 11 is a back view of the friction pad backing metal in which the sixth example of the invention is incorporated;

FIG. 12 is a section taken along the plane indicated by line XII—XII in FIG. 11 as viewed in the arrow direction;

DETAILED DESCRIPTION

Figure 1:
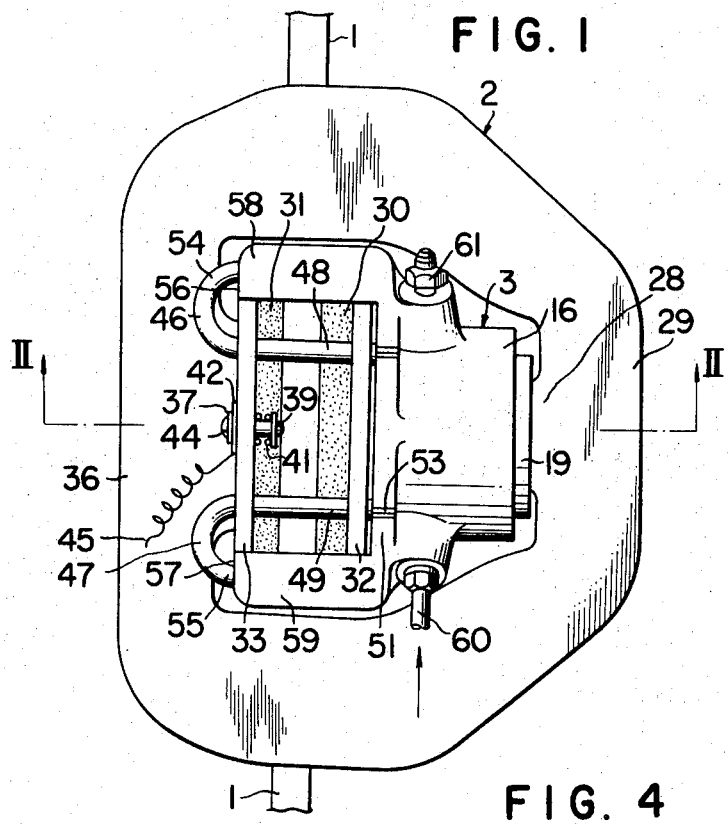
FIG. 1 is a plan view of a disk-brake, friction-pad assembly in which one example of a wear detector of a wear-warning device according to the invention is incorporated.

Referring first to FIGS. 1, 2, and 3, the example of the invention illustrated therein is incorporated in a disk brake assembly including a brake disk 1, fixed integrally and coaxially to a rotating member or hub 6, which is rotatably supported by bearings 7 and 8 on an axle 5 coaxially therewith. The axle 5 at its inner end is secured to a part 4 of the chassis of a vehicle. A wheel 9 is fixed by bolts 10 integrally and coaxially to the hub 6 and the brake disk 1, which thereby always rotates integrally with the wheel 9 and hub 6. The bearing 7 and the hub 6 are held axially in place by a nut 11 screw engaged with the threaded outer end of the axle 5. The nut 11 and outer axle end are protected by a dust cover 12.

The disk brake assembly also comprises at least one stationary braking mechanism for applying frictional braking force to the brake disk 1. This mechanism has a hydraulic cylinder 3 having an extension 13, which is fixed by bolts 14 to an extension 15 of the chassis part 4. The hydraulic cylinder 3 has a cylinder 16 having a bore 17 formed therein with open ends and provided with two opposed pistons 18 and 19 slidably accommodated in the bore 17. The opposed heads of the pistons 18 and 19 and the bore surface define a hydraulic fluid chamber 20, which is normally communicated with a hydraulic master cylinder (not shown). The cylinder 16 is provided in its bore surface near its two open ends with oil seal rings 21 and 22 and dust seals 23 and 24.

The piston 19 is of hollow cylindrical shape with an open outer end and contains therein a spacer 25 contacting the inner surface of the head wall of the piston and an insert 26 lightly tapped into place within the hollow interior of the piston and having a rectangular hole 27 formed at its center. In this hole 27 is fitted an inwardly projecting part 28 of a movable frame or yoke 2, which is a ring-shaped flat plate, whereby the right-hand end (as viewed in FIG. 1) of the movable yoke 2 is restrained from moving in up-and-down directions as viewed in FIGS. 1 and 2, that is, in directions perpendicular to the axis of the piston 19.

The skirt end or the end remote from the head of the aforementioned piston 18 abuts against a pad backing metal 32 for backing a friction pad 30 adapted to contact the brake disk 1 on one side thereof. On the opposite side of the brake disk 1, there is provided another friction pad 31 backed by a pad backing metal 33. The friction pads 30 and 31, which are bonded by an adhesive to their respective backing metals 32 and 33, are adapted to clamp the brake disk 1 therebetween thereby to apply braking force to the brake disk.

The backing metal 33 is provided on its side opposite the side of the pad 31 and at its central part, that is, at its part through which the axis of the pistons 18 and 19 passes, with a slot 35. Into this slot 35 is fitted an inwardly projecting part 34 of the movable yoke 2, this projecting part 34 being opposed to and in alignment with the aforementioned projecting part 28. Thus, movements of the left-hand end (as viewed in FIG. 1) of the movable yoke 2 in directions perpendicular to the axis of the pistons 18 and 19, with respect to the backing metal 33 are prevented.

The hydraulic cylinder 3 is provided with rigid arms 58 and 59 extending therefrom toward the backing metal 33 and clearing the outer periphery of the brake disk 1. The extremities of these arms have surfaces 56 and 57 which are perpendicular to the axis of the hydraulic cylinder 3 and are respectively provided with holes with axes parallel to the axis of the cylinder 3.

One end 54 of a guide pin 46 and one end 55 of another guide pin 47 are inserted into these holes in arms 58 and 59, respectively. The guide pins 46 and 47 are U-shaped, and their other ends 48 and 49 are passed through backing metals 33 and 32 and extend to parts 50 and 51 of the hydraulic cylinder 3, being prevented by clip pins 52 and 53 from moving in the direction parallel to the axis of the hydraulic cylinder, that is, the left-and-right direction as viewed in FIG. 1. These guide pins 46 and 47 function to guide the backing metals 32 and 33 so that the friction pads 30 and 31 bonded thereto can move freely in the direction parallel to the axis of the brake disk 1.

The aforementioned hydraulic fluid chamber 20 within the hydraulic cylinder 3 is communicated by way of a hydraulic pressure pipe 60 to the aforementioned master cylinder (not shown), whereby any pressure developed within the master cylinder is transmitted through the pipe 60 to the hydraulic fluid chamber 20. A bleeder opening 61 with a stopper is provided for bleeding out air or deaeration from the hydraulic cylinder 3.

In accordance with the invention, there is provided, in a disk brake mechanism of the above described organization, a wear detecting and warning device, one example of which is as described below.

The backing metal 33 is provided near its edge at a point midway between the guide pins 46 and 47 with a counterbored or stepped hole into which is fitted a guide sleeve 37 made of an electrically insulating material. The guide sleeve 37 has a hole 38, through which the stem 39 of a wear-detecting switch is inserted. The stem 39 has, on the inner side thereof, a flange 40, between which and the backing metal 33, a compressed coil spring 41 is disposed to exert a force on the flange 40 continually urging the stem 39 inward, i.e., toward the friction pad 30.

The guide sleeve 37 is provided, at and near its outer end, with two closely spaced apart flanges between which an annular groove 43 is formed for accommodating the inner part of an annular metal disk 42, which in normal state is caused by the action of the coil spring 41 to be in contact with backing metal 33. A screw 44 is screwed into the tapped outer end of the switch stem 39 thereby to fix the guide sleeve 37 to the stem 39, a conductor lead wire 45 is connected to the metal disk 42 for connecting the disk to an electrical system described hereinafter.

The first example of the invention of the above described organization operates in the following in conjunction with the above described disk brake mechanism.

When a hydraulic pressure is produced in the aforementioned master cylinder (not shown), this pressure is transmitted by means of the hydraulic fluid through pipe 60 and into fluid chamber 20 of hydraulic cylinder 3, where the pressure urges opposed pistons 18 and 19 apart, that is, piston 18 leftward and piston 19 rightward as viewed in FIG. 2. As a result, piston 18 presses backing metal 32 leftward and thereby causes friction pad 30 to be pressed against the corresponding side surface of brake disk 1. At the same time, the rightward force exerted on piston 19 is transmitted through movable yoke 2 and backing metal 33 to press friction pad 31 against the other side surface of brake disk 1. Thus, the brake disk 1 is clamped between opposed friction pads 30 and 31 and is thereby braked, irrespective of the direction in which it is rotating.

In producing this braking action, pistons 18 and 19 are displaced apart from each other by the hydraulic pressure in fluid chamber 20, and sealing rings 21 and 20 are caused to exert small forces tending to return pistons 18 and 19 toward each other. Accordingly, when the brake is released, that is, the hydraulic pressure in fluid chamber 20 is removed, there is no possibility of a so-called "brake drag" state wherein the friction pads 30 and 31 remain in rubbing contact with the brake disk.

As the braking action is repeated, progressive wear of the surfaces of friction pads 30 and 31 contacting brake disk 1 each time occurs until, finally, the amount of wear reaches a certain limiting value. The aforedescribed wear-detecting switch is so designed that, when pads 30 and 31 are worn to this extent, the extreme inner end 39a of stem 39 abuts against the inner surface 32a of backing metal 32.

Consequently, stem 39 is displaced outwardly (toward the left as viewed in FIGS. 1, 2, and 3) relative to backing metal 33, compressing spring 41. As a result, metal disk 42 separates from backing metal 33, whereby electrical contact therebetween is broken. Consequently, an electric current which has been flowing through a circuit including lead wire 45, metal disk 42, backing metal 33, guide pins 46 and 47, and hydraulic cylinder 3 is cut off, and an electrical system as described below operates to light a warning lamp.

Figure 8:
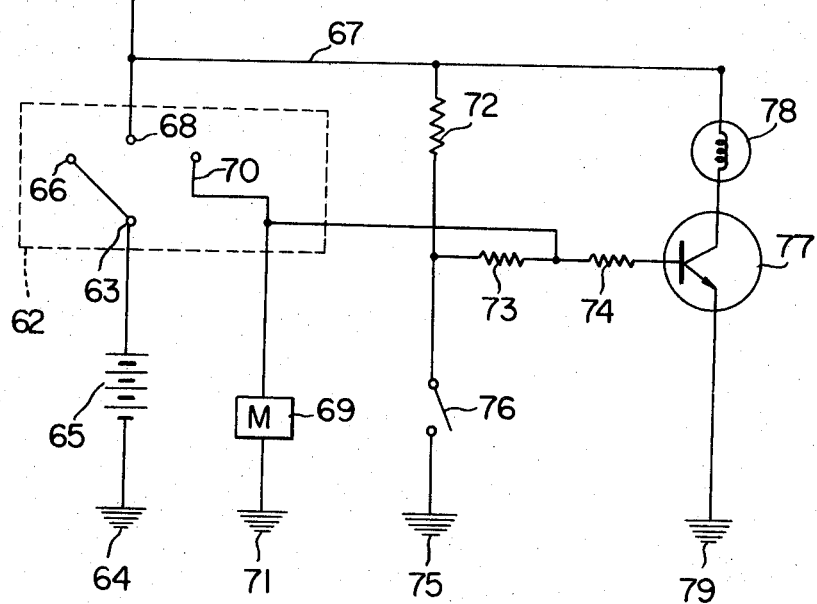
FIG. 8 is an electrical circuit diagram indicating one example of an electrical system for operating the warning device of the invention.

Referring now to FIG 8, the electrical system illustrated therein is a warning system combined with the electrical ignition system of a motor vehicle. The ignition system comprises an ignition switch 62 having a movable contact with a common terminal 63 and stationary contacts 66, 68, and 70, a battery 65 with its positive terminal connected to the terminal 63 and its negative terminal grounded (earthed) at 64, an ignition coil (not shown) connected (arrow N) through a bus 67 to the contact 68, and an engine starter motor 69 connected between contact 70 and ground (earth) 71. The contact 66 is unconnected.

The example electrical system of the wear-warning device of the invention comprises a wear-detecting switch 76, one example of which was described hereinbefore, a transistor 77, a warning lamp 78 connected between the bus 67 and the collector terminal of the transistor 77, a fixed resistance 72 connected between the bus 67 and one terminal of the switch 76, the other terminal of which is grounded (earthed) at 75, and fixed resistances 73 and 74 connected in series and between the junction between the resistance 72 and the switch 76 and the base of the transistor 77, the emitter of which is connected to ground (earth) 79. The junction between the contact 70 and the motor 69 is connected to the junction between the resistances 73 and 74.

The electrical system of the above described organization operates in the following manner. When the vehicle is running in the normal manner, ignition switch 62 is in the state wherein terminal 63 is connected to contact 68, whereby the voltage of battery 65 is applied to bus 67. While the friction pads (30 and 31 in the aforedescribed example) of each disk brake are in a serviceable state, wear detecting switch 76 is closed, whereby the base potential of transistor 77 is approximately zero, and transistor 77 is in a cut-off or non-conductive state. Consequently, warning lamp 78 is not lit.

When the wear of the friction pads reaches or exceeds the limiting amount and wear-detecting switch 76 opens, or when wear-detecting switch 76, itself, or wiring in the vicinity thereof is damaged, a current flows through resistances 72, 73, and 74 to the base of transistor 77, whereby transistor 77 becomes conductive, and warning lamp 78 is lit thereby indicating wear of the friction pads or the above mentioned damage.

Furthermore, when ignition switch 62 is turned (terminal 63 is connected to contact 70) to start the vehicle engine, the battery voltage is applied to starter motor 69, whereby a base current is applied to through resistance 74 to transistor 77, which thereupon becomes conductive to light warning lamp 78. That is, it is possible at the time of engine starting to check and determine whether or not warning lamp 78, transistor 77, and related parts are operating normally.

Figure 4:
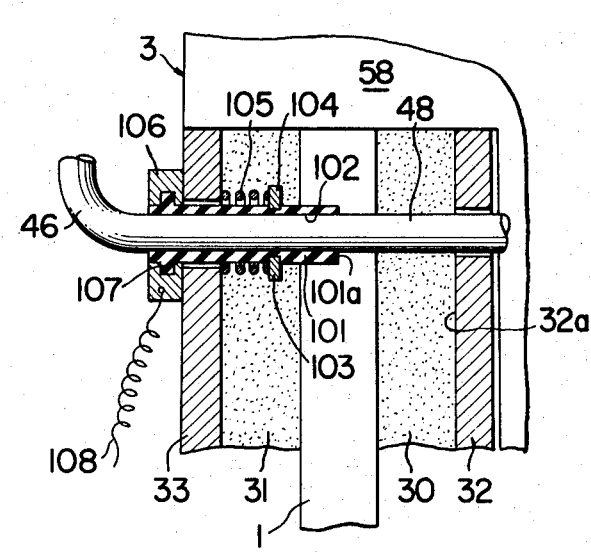
FIG. 4 is a sectional view, similar to FIG. 3, showing a second example of a wear detector constituting an embodiment of the invention.

In the second example of the invention as illustrated in FIG. 4 (in which parts similar to corresponding parts in the first example are designated by the same reference numerals), a guide sleeve 101 made of an electrically insulative material and having a bore 102 is fitted slidably onto the part 48 of the guide pin 46. The sleeve 101 has an annular circumferential groove 103 accommodating the inner part of a ring-shaped washer 104, between which and the backing metal 33, a compression coil spring 105 is provided around the guide sleeve 101.

The guide sleeve 101, in assembled state, extends from its inner end at a point approximately midway between the backing metals 32 and 33 to its outer end outside of the backing metal 33. This outer end has a flange 107 which is fitted into an internal annular groove in a metal ring 106, which in normal state is pressed against the backing metal 33 by the force of compression spring 105. A lead wire 108 is connected to the metal ring 106 to apply electric current thereto.

When the metal ring 106 is in contact with the backing metal 33 as shown in FIG. 4, the lead wire is grounded (earthed) through the hydraulic cylinder 3 or the vehicle chassis, that is, the switch 76 in the circuit of FIG. 8 is in closed state, and the warning lamp 78 is not lit as described hereinabove.

However, when the wear of the friction pads 30 and 31 reaches a limiting value after repeated use, the inner end surface 101a of the guide sleeve 101 abuts against the inner surface 32 of the backing metal 32 which has approached the sleeve 101 in a relative manner. Consequently, the contact between the metal ring 106 and the backing metal 33 is broken by the force of the spring 105. That is, switch 76 in the circuit of FIG. 8 opens, whereby warning lamp 78 is lit as described in conjunction with FIG. 8.

Figure 5:
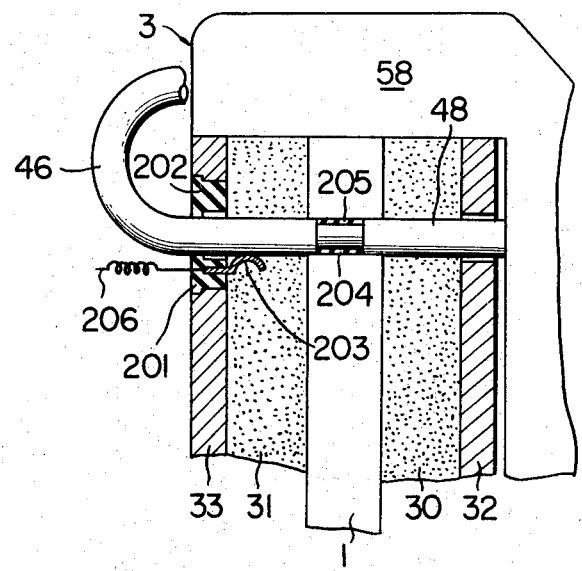
FIG. 5 is a sectional view, similar to FIG. 3, showing a third example of a wear detector according to the invention.

In the third embodiment of the invention as illustrated in FIG. 5 (in which parts similar to corresponding parts in the first example are designated by the same reference numerals), a guide bushing 201 made of an electrically insulative material and having a flanged outer part is fitted into a stepped hole 202 in the backing metal 33, and the parts 48 of the guide pin 46 is slidably passed through the bore of the bushing 201. A metal contact member 203 is passed through the guide bushing 201 and has an inner contact part normally in contact with the guide pin 46. The outer end of the member 203 is connected to a lead wire 206. The guide pin 46 in this case is provided with an annular circumferential groove 205, in which a cylindrical insulator 204 is fitted.

Similarly as in the second example, when the friction pads 30 and 31 of this third example are in a normal, serviceable state, the contact member 203 is contacting the guide pin 46 and is grounded (earthed) through the hydraulic cylinder 3 or the vehicle chassis, whereby the warning lamp 78 is not lit. However, when the pads 30 and 31 are worn to the limiting degree, the contact member 203, which was initially contacting the guide pin 46, slides onto the cylindrical insulator 204, and its electrical contact with the guide pin 46 is broken, whereupon the warning lamp 78 is turned on.

Figure 6:
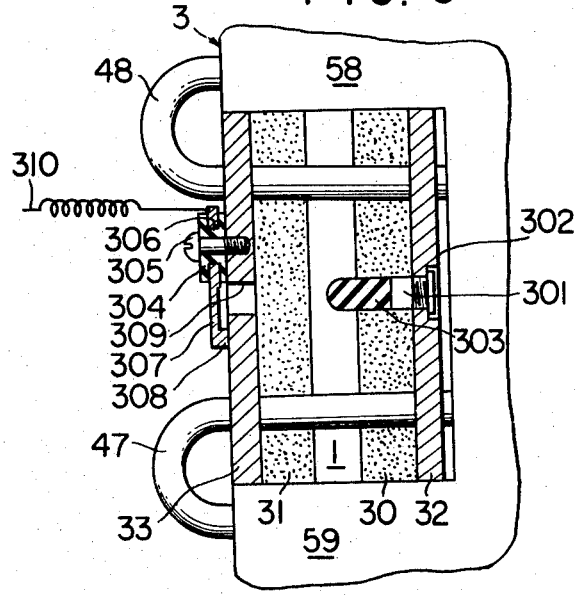
FIG. 6 is a sectional view, similar to FIG. 3, showing a fourth example of a wear detector according to the invention.

In the fourth embodiment of the invention as illustrated in FIG. 6 (in which parts similar to the corresponding parts in the first example are designated by the same reference numerals), a stem member 301 is screw fastened at 302 in the backing metal 32 and supports a projecting member 303 made of an electrically insulative materal and projecting toward the opposite backing metal 33.

A hole 309 in axial alignment with the projecting member 303 is formed through the backing metal 33 to permit eventual passage therethrough of the member 303. On the outer side of and in position to cover this hole 309, there is disposed a metal-leaf contact member 307 in the form of a cantiliver beam with a base part fitted in an annular groove 306 formed around the circumferental surface of a washer insulator 304, which is secured to the backing metal 33 by a screw 305. The free end of the contact member 307 is normally in electrical contact with the backing metal 33, and a lead wire 310 is connected to this contact member 307.

Similarly as in the preceding examples, the lead wire 310 is normally grounded (earthed) through the contact member 307 and the hydraulic cylinder 3 or the vehicle chassis, whereby the warning lamp 78 is unlit. When the friction pads 30 and 31 are worn to the limiting degree, the projectng member 303 passes through the hole 309 and, abutting against the contact member 307, forces it to separate from the backing metal 33, whereby the equivalent switch 76 in the circuit of FIG. 8 is opened, and the warning lamp 78 is lit.

Figure 7:
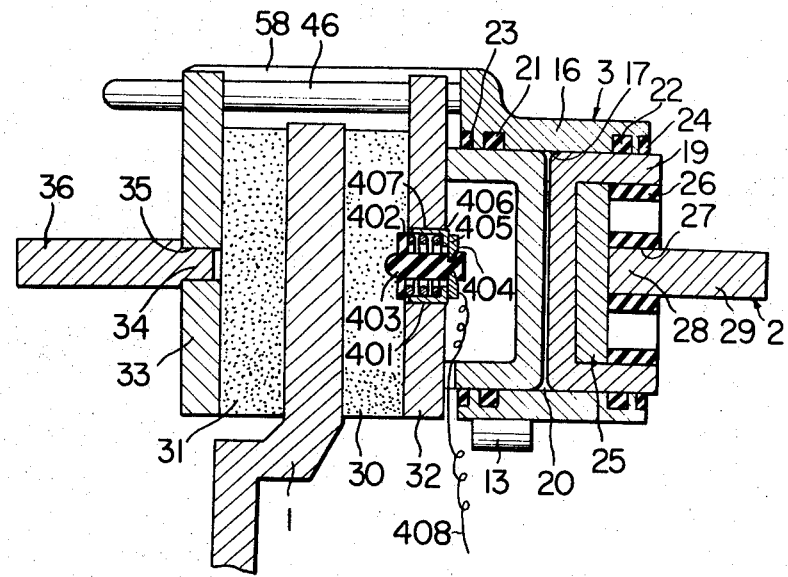
FIG. 7 is an enlarged section, similar to FIG. 2, showing a fifth example of a wear detector according to the invention.

In the fifth embodiment of the invention as illustrated in FIG. 7 (in which parts similar to the corresponding parts in the first example are designated by the same reference numerals), a switch stem 401 made of an electrically insulative material and having a flange 402, a projection 403, and an annular groove 404 is disposed within the backing metal 32. A ring-shaped contact member 405 is fitted in the groove 404 and is normally in contact with a metal spring retainer 406 of cylindrical shape tapped into a through hole in the backing metal 32, the switch stem 401 passing substantially coaxially through the spring retainer 406. A compression coil spring is placed in a somewhat precompressed state around the shank of the switch stem 401 and between the flange 402 and the end spring-retaining wall of the spring retainer 406. A lead wire 408 is connected to the contact member 405.

Similarly as in the preceding examples, the contact member 405 is normally in contact by way of the spring retainer 406 with the backing metal 32, and the lead wire 408 is grounded (earthed) through the hydraulic cylinder 3 or the vehicle chassis, whereby the warning lamp 78 is unlit. When the wear of the friction pads 30 and 31 reaches a certain limit, the projection 403 abuts against the brake disk 1 and, eventually, overcoming the force of the spring 407, separates the contact member 405 from the spring retainer 406, thereby breaking the circuit through the lead wire 408. Consequently, the warning lamping 78 is lit.

FIGS. 9, 10, 11, and 12 illustrate the sixth embodiment of the invention in which a friction pad 112 and a backing metal 113 are compression formed into an integral pad unit 111. During the compression forming of this unit, the friction pad material is caused to flow into and fill a plurality of holes 114, 115, 116, 117, and 118 formed in the backing metal thereby to strengthen the bond between the pad 112 and the backing metal 113. The backing metal 113 is provided with mounting holes 119 and 120 for purposes such as mounting the unit 111 on a part such as a brake body (not shown).

In the friction pad 112 and in an axial position to be axially aligned with the hole 115 formed in the backing metal 113, there is formed a hole 122 of a depth from the friction surface 121 of the pad 112 equal to the allowable wear limit $a$ of the friction pad 112. Two through holes 125 and 126 are formed with a spacing distance $b$ through the pad material filling the hole 115 from the end wall surface 123 of the hole 122 to the opposite surface 124 on the backing metal side of the pad 112.

Through these holes 125 and 126 and across the deepest part of the hole 122, a single electroconductive wire 127 coated with an insulation film is passed, as at $d$, $e$, $f$, and $g$, to form a loop. This wire 127 is passed on the side of the surface 124 of the pad 112 through a cylindrical member 128, and the two ends 129 and 130 of this wire 127 are connected to a connector 131 having two contacts.

A spring member 132 made of a spring material is provided at one end thereof with a clamping part 134 for fixedly clamping the upper part 133 of the backing metal 113. The spacing between the jaws of this clamping part is somewhat less than the thickness of the backing metal 113, whereby ample spring force is afforded for secure clamping action.

In the free state of this spring member 132, the lower part 135 thereof is in position $h$, as indicated in FIG. 10, separated from the back surface 136 of the backing metal 113. This lower part 135 of the spring member 132 in assembled state is in a position midway between parts 137 and 138 of the wire 27 encompassed by the cylindrical member 128 and is in the state indicated by $i$. Accordingly, the lower part 135 of the spring member 132 in the position $i$ is nearer to the back surface 136 of the backing metal 113 by a distance $c$ than it is in the free position $h$, whereby it is continually urging the wire 127 in the direction $j$ as indicated in FIG. 10.

A projecting part 139 is formed in the upper part of the spring member 132 to hold the wire 127. The above mentioned distance $c$ is made smaller than the thickness of the backing metal 113, and the distance between $k$ and $l$ of the aforementioned hole 125 as shown in FIG. 10 is made equal to the distance $c$. The friction pad 112 is made of an electrically insulative material. The ends 129 and 130 of the wire 127 are connected by way of the connector 131 to a warning circuit as described hereinbefore.

With repeated braking action, the rubbing surface 121 of the friction pad 112 is progressively worn, and when the limiting degree $a$ of wear is finally reached, a part of the wire exposed on the end wall surface 123 of the hole 122 provided in the pad 112 is contacted and abraded by the brake disk until it is cut. Consequently, the spring force of the spring member 132 causes it lower part 135 to move from its assembled position $i$ by the distance $c$ to its free position $h$, whereby the parts of the wire 127 in the holes 125 and 126 are drawn from $k$ to $l$ through a distance equal to distance $c$. Thus, the wire 127 is cut, and the circuit thereof is opened, whereby the warning lamp is lit.

Because of the organization of the detecting switch according to the invention as described above, it is not necessary to insert the wire 127 at the time the friction pad 112 and the backing metal 113 are formed, it being possible to insert the wire 127 through hole 125, across the end wall of the hole 122, and through the hole 126 after the pad 112 and backing metal 113 have been formed and compressed together. Accordingly, the positioning of wire 127 is greatly facilitated. Furthermore, since the depth of the hole 122 and the limiting degree $a$ of wear of the pad 112 are made equal, this wear limit can be set at will, and wear reaching this limit can be accurately detected.

A further feature of this example of the invention is that the holes 112, 125, and 126 in the friction pad material filling the hole 115 in the backing metal 113 can be formed with greater ease than similar holes formed in the backing metal 113. Moreover, the insulation afforded by the friction pad material is convenient for isolating the cut ends of the wire 127 from each other and from metal parts.

Figure 13:
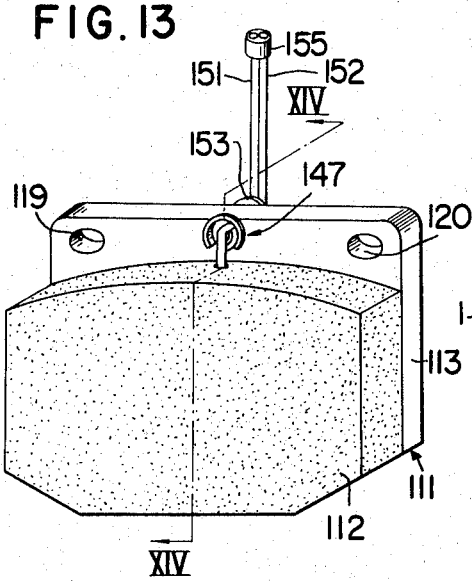
FIG. 13 is a perspective view showing a seventh example of embodiment of the invention.
Figure 14:
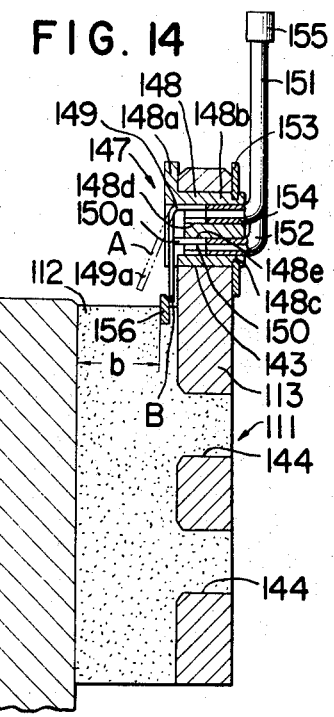
FIG. 14 is a section taken along the plane indicated by line XIV—XIV in FIG. 13 as viewed in the arrow direction.

In the seventh example of the invention as illustrated in FIGS. 13 and 14, a friction pad 112 and a backing metal 113 are formed by compression into an integral pad unit 111 similarly as in the preceding sixth example, the integral construction of the pad 112 and the backing metal 113 being further strengthened against separation thereof by filling a plurality of holes 144 formed in the backing metal 113 with a portion of the friction pad material. The integral pad unit 111 thus formed is mounted by bolts passed through holes 119 and 120 in the backing metal 113 and secured to a brake body (not shown).

On the upper part (as viewed in FIGS. 13 and 14) of the backing metal 113, there is mounted a detecting switch 147 according to the invention comprising a switch body 148, electrical contacts 149 and 150, electrical conductor wires 151 and 152, and other parts. The switch body 148, which has a flange 148a and a skirt 148b, an annular circumferential groove 148c, holes 148d and 148e formed therethrough, is fitted in a through hole 143 formed in the upper part of the backing metal 113. A stop ring (or circular clip ring) 153 is fitted in the groove 148c to secure the switch body 148 in place.

The wires 151 and 152, which are coated with an insulator 154, have respective ends which, in the holes 148d and 148e, are connected with and fixed to the electrical contacts 149 and 150. The other ends of the wires 151 and 152 are connected to a connector 155.

The above mentioned contact 149 is made of a spring material connected at one end thereof to the wire 151, the other end 149a of which is in the position A shown in FIG. 14 in its free state. In its assembled, normal state, this end 149a of the contact 149 is at the position B shown in FIG. 14 determined and fixed by a member 156 partly imbedded in the friction pad 112 at a position corresponding to an allowable wear limit b and made of the same material as the pad 112 or a soft material such as a resin.

The other end 150a of the electrical contact 150 connected at one end to the wire 152 is adapted to contact one part of the electrical contact 149 in the assembled state. The friction pad 112 is adapted to be pressed against the brake disk 1 as in the preceding examples.

When, after a long period of use, friction pad 112 of the above described integral pad unit 111 is worn by frictional contact with brake disk 1 by a limiting depth b, member 156 is abraded by brake disk 1 and releases contact 149, which thereupon is caused by spring force to deflect from the normal assembled state B to the free state A. That is, the wear-detecting circuit which has been closed by contacts 149 and 150 is opened by the deflection of contact 149. Consequently, the warning circuit operates to light warning lamp 78.

Figure 15:
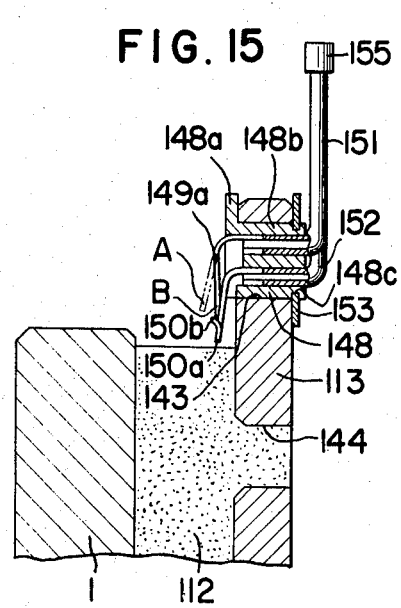
FIGS. 15 and 16 are sectional views, similar to FIG. 14, showing respective modifications of the example illustrated in FIGS. 13 and 14.
Figure 16:
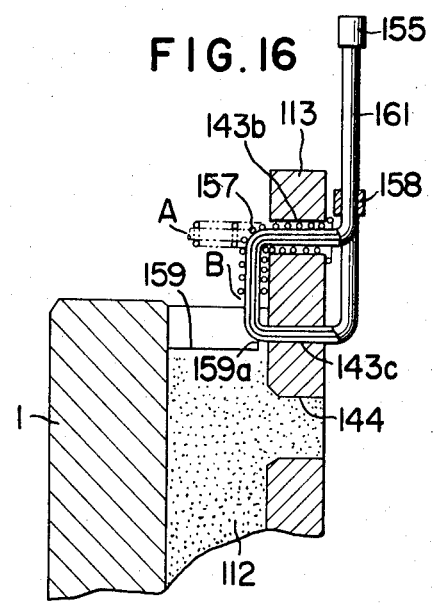

Modifications of the example shown in FIGS. 13 and 14 and constituting eighth and ninth embodiments of the invention are illustrated respectively in FIGS. 15 and 16, in which parts similar to corresponding parts in the proceding example are designated by the same reference numerals and characters.

In the modification shown in FIG. 15, a projecting part 150b is formed on the distal end 150a of the electrical contact 150 so as to fix the position of the distal end 149a of the electrical contact 149. This position corresponds to the limit wear position of the friction pad 112.

When the wear of friction pad 112 in this modified example reaches the limit, brake disk 1 presses against distal end 150a of contact 150, whereupon distal end 149a of contact 149, which has been held in position by projecting part 150b of end 150a, is released and moves from the normal assembled position B to the free position A, thereby opening the detecting circuit and lighting warning lamp 78.

In the modification illustrated in FIG. 16, holes 143b and 143c are formed in the backing metal 13, and a hole 159 of a depth at its end wall surface 159a equal to the wear limit is formed at the upper surface of the friction pad 112. A single conductor wire 161 extends through the hole 143b, along the end wall surface 159a of the hole, and through the hole 143c to form a loop. The part of the wire 161 passing through the hole 143b and along the end wall surface of the hole 159 is encompassed by a coil spring 157.

The parts of the wire 161 emerging from their respective holes 143b and 143c and extending parallelly upward together are secured together by a collar member 158 fitted therearound to prevent the wire 161 from being deformed by the returning force of the coil spring 157 from the normal assembled position and state at B to a position corresponding to the free state A of the coil spring 157.

When the wear of friction pad 112 in this example reaches the limit, the part of wire 161 nearest brake disk 1 is abraded by disk 1 and is thereby cut. The end thus cut and encompassed by coil spring 157 is thereupon forced by the returning force of this spring to deflect from the normal assembled state B to a position corresponding to the free state A of spring 157, whereby the detecting circuit is opened, and warning light 78 is lit.

Thus, in the seventh and eighth examples described above and illustrated in FIGS. 13 and 14 and FIG. 15, respectively, electrical contacts are released and open under spring force when the wear of the friction pad reaches a predetermined limit, while in the ninth example illustrated in FIG. 16, abrasion and cutting of an electrical conductor wire releases one cut end encompassed by a coil spring to be deflected to break the detecting circuit.

In all of these examples according to the invention, there is no possibility of the detecting circuit, once it is thus broken, being closed again irrespective of whether the disk brake is applied or whether it is released, whereby the open-circuit state is sustained to continue the rendering of the wear warning.

Furthermore, when the detecting switch, contacts, or wire or wiring in the vicinity thereof, which are easily damaged because of their exposed installation, are thus damaged and break, the detecting circuit is opened in each case, whereby the warning lamp is lit to indicate the breakage. Another advantageous feature of the warning device according to the invention when installed in a disk brake of a motor vehicle is that, as mentioned hereinbefore, the operational state of the warning lamp, transistor, and other components of the warning device can be verified when the engine of the vehicle is started.

It will be appreciated that these accessory functions, in addition to the principal function of indicating excessive wear of disk brake friction pads, all contribute to safety.

While the present invention has been described above with respect to wear-detecting devices each of which is used for one pair of opposed friction pad units as illustrated in FIGS. 1 through 7 or for each single pad unit as illustrated in examples shown in FIGS. 9 through 16, a wear-detecting device of the invention may be installed in every pair of opposed friction pads or in every friction pad in a disk brake or a plurality of disk brakes of a vehicle. In some cases, the wear-detecting device may be used distributively for obtaining representative samplings of pad wear.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention. For example, while a warning lamp is used in each of the above described examples of the invention, it will be apparent that, depending on the necessity, a warning sound means such as a buzzer can be used instead of or in conjunction with the warning light.

We claim:

1. In a disk brake having a brake disk and friction pads backed by respective backing materials and adapted to be pressed by the backing materials against the brake disk to apply frictional braking force thereto, a wear-warning device comprising, in combination, detecting switch means coupled to at least one of said backing metals to sense movement thereof relative to said brake disk, said switch means being in normally-closed state for normal serviceable condition of the friction pads and being opened by said movement when the wear of the friction pads reaches a predetermined limiting degree, spring means adapted to be brought in engagement with said detecting switch means when the wear of said friction pads is within said predetermined limiting degree and to be released from said detecting switch means upon opening of said detecting switch means and brought in a free state by its own force, and warning means connected to the detecting switch means and operating in response to the opening thereof to produce a warning.

2. A wear-warning device as defined in claim 1, which is provided in a disk brake of a motor vehicle having an electrical system including an engine starter motor, an ignition switch, and a battery, and in which said electrical circuit is so connected to said electrical system that said battery is utilized as said electric power source, and said warning lamp is lit also at the time of operation of said ignition switch to start said starter motor, whereby the operation state of the warning lamp, switching device, and related parts can be checked.

3. A wear-warning device as defined in claim 1, in which said spring means is a leaf spring-like member.

References Cited
UNITED STATES PATENTS

| | | | |
|---|---|---|---|
| 3,321,045 | 5/1967 | Veilleux | 188—1 A |
| 3,440,604 | 4/1969 | Phillips | 188—1 A UX |
| 3,556,258 | 1/1971 | Winge et al. | 188—1 A |

DUANE A. REGER, Primary Examiner

U.S. Cl. X.R.

116—114 AE; 200—61.4; 340—52 A